United States Patent [19]
Robinson et al.

[11] Patent Number: 5,647,561
[45] Date of Patent: Jul. 15, 1997

[54] CONTAINMENT ASSEMBLY FOR SPIN TABLE

[75] Inventors: Wilfred Robinson; David R. Koehler, both of Glendale, Ariz.

[73] Assignee: Honeywell Inc., Minneapolis, Minn.

[21] Appl. No.: 105,752

[22] Filed: Aug. 12, 1993

[51] Int. Cl.$^6$ ................................................ B64G 1/64
[52] U.S. Cl. .................... 244/158 R; 244/161; 403/338; 285/407; 220/320
[58] Field of Search ............................. 244/158 R, 161, 244/163; 220/320, 321; 285/407–410; 403/338, 336, 335

[56] References Cited

U.S. PATENT DOCUMENTS

| 29,731 | 8/1860 | Truss | 403/338 |
|---|---|---|---|
| 1,784,516 | 12/1930 | Fairbanks | 220/320 |
| 3,174,706 | 3/1965 | Wagner . | |
| 3,420,470 | 1/1969 | Meyer . | |
| 4,506,852 | 3/1985 | Adams et al. | 244/161 |
| 4,702,440 | 10/1987 | Guether et al. | 244/165 |
| 4,715,565 | 12/1987 | Wittmann | 220/321 |
| 5,125,601 | 6/1992 | Monford, Jr. . | |

FOREIGN PATENT DOCUMENTS

| 143760 | 10/1991 | Australia | 220/321 |
|---|---|---|---|
| 2181709 | 4/1987 | United Kingdom . | |

*Primary Examiner*—Galen L. Barefoot
*Attorney, Agent, or Firm*—Thomas A. Rendos

[57] ABSTRACT

A system for releasably restraining a first element and a second element is disclosed. The containment system uses a tensioner to urge a clamp into contact with the first element and with the second element, and a release selectively operates the tensioner to remove the clamp from contact with the first and second elements to permit relative movement therebetween. The clamp is particularly useful in maintaining a gap between the first and second elements which permits relative movement between the first and second elements after the clamp is removed.

18 Claims, 3 Drawing Sheets

CONTAINMENT ASSEMBLY FOR SPIN TABLE

BACKGROUND OF THE INVENTION

1. Field of the Invention

The present invention relates to a system which restrains components to prevent relative movement, and then releases to permit movement of the components. More particularly, the present invention relates to a containment system which restrains movable components during travel, such as in the launch of a satellite, and then releases the components to permit movement.

2. The Prior Art

The deployment of a satellite in space is typically performed after the satellite has been carried to a zero gravity orbit by a rocket booster or other vehicle. The satellite is lifted by the launch vehicle and is deployed into a higher stable orbit by imparting a rotational movement to the satellite as the satellite is released. This rotational movement is typically caused by a spin table connected to the launch vehicle which mechanically rotates and releases the satellite. The satellite or other payload can vary in size and weight.

The successful deployment of payloads such as satellites presents an engineering challenge caused by numerous variables. For example, the system for retaining the payload must survive launch forces which may exceed the force of gravity by a multiple of ten. The temperatures affecting the system range from the ambient temperatures of the launch environment to the subzero temperatures in orbit. In addition, the deployment system must be sufficiently strong to handle these variables and the sheer mass of the payload in the most weight efficient manner, as the weight of the deployment system must be lifted by the launch vehicle.

Existing spin tables have been developed to carry a satellite to the deployment elevation and to release the satellite. A spin table generally comprises a large ring gear rotated by pinion gears connected to two drive motors. The ring gear is connected by a rotating structure to the satellite, and this rotating structure rotates on a bearing engaged with the base structure of the system. Initially, the rotating structure contacts the base structure to prevent relative movement during launch. After the satellite has been raised to the deployment elevation, the rotating structure is displaced from contact with the base structure so that the ring gear and rotating structure can spin the satellite relative to the base structure. This displacement of the rotating structure can be accomplished by an off-load spring, shaped as a large Belleville spring, connected between the ring gear and the rotating structure. When the preloaded tension on the off-load spring is released, this spring displaces the rotating structure from contact with the base structure so that the drive motors can spin the ring gear and attached rotating structure and satellite. After the satellite reaches a selected angular speed, the satellite is release from the rotating structure.

There are several disadvantages to using an off-load spring to separate the rotating structure from the base structure. For example, the manufacturing tolerances and specifications of the large off-load spring are precise, and slight variations from such tolerances can result in failure of the entire system. In addition, the off-load spring is subjected to large temperature variations, and these variations can adversely affect the operation of the system. Although the spin table operates in a zero gravity environment, the spin table is typically tested under gravity. In a test of a payload having a weight of six tons, tremendous forces act against the off-load spring, and these forces complicate testing procedures.

For these reasons, a need exists for an improved system for releasable restraining components. The system should be capable of handling large forces without movement, and should be easily removed for deployment of the components.

SUMMARY OF THE INVENTION

The present invention discloses an improved system for restraining components to prevent relative movement between the components. The system releasably restrains a first element and a second element which are separated by a gap. A clamp is adapted for contact with the first element and the second element, and a tensioner is capable of urging the clamp into contact with the first element to prevent relative movement between the first and second elements. A release operates the tensioner to remove the clamp from contact with the first and second elements.

In another aspect of the invention, the system is adapted to a first element which is rotatable about the second element, and the clamp includes two ends which can be pulled together to urge the clamp into contact with the first and second elements.

In another aspect of the invention, the clamp is insertable into the gap between the first and second elements to contact and to prevent relative movement between the first and second elements. This aspect of the invention prevents the first element from initially moving relative to the second element, and further maintains the gap between the first and second element to permit relative movement therebetween after the release operates the tensioner to remove the clamp from contact with the first and second elements.

In another aspect of the invention, the system further comprises an improved bearing anchored to the first element and to the second element to permit relative movement therebetween after the release operates the tensioner to remove the clamp from contact with the first and second elements.

DESCRIPTION OF THE PREFERRED EMBODIMENTS

Figure 1:
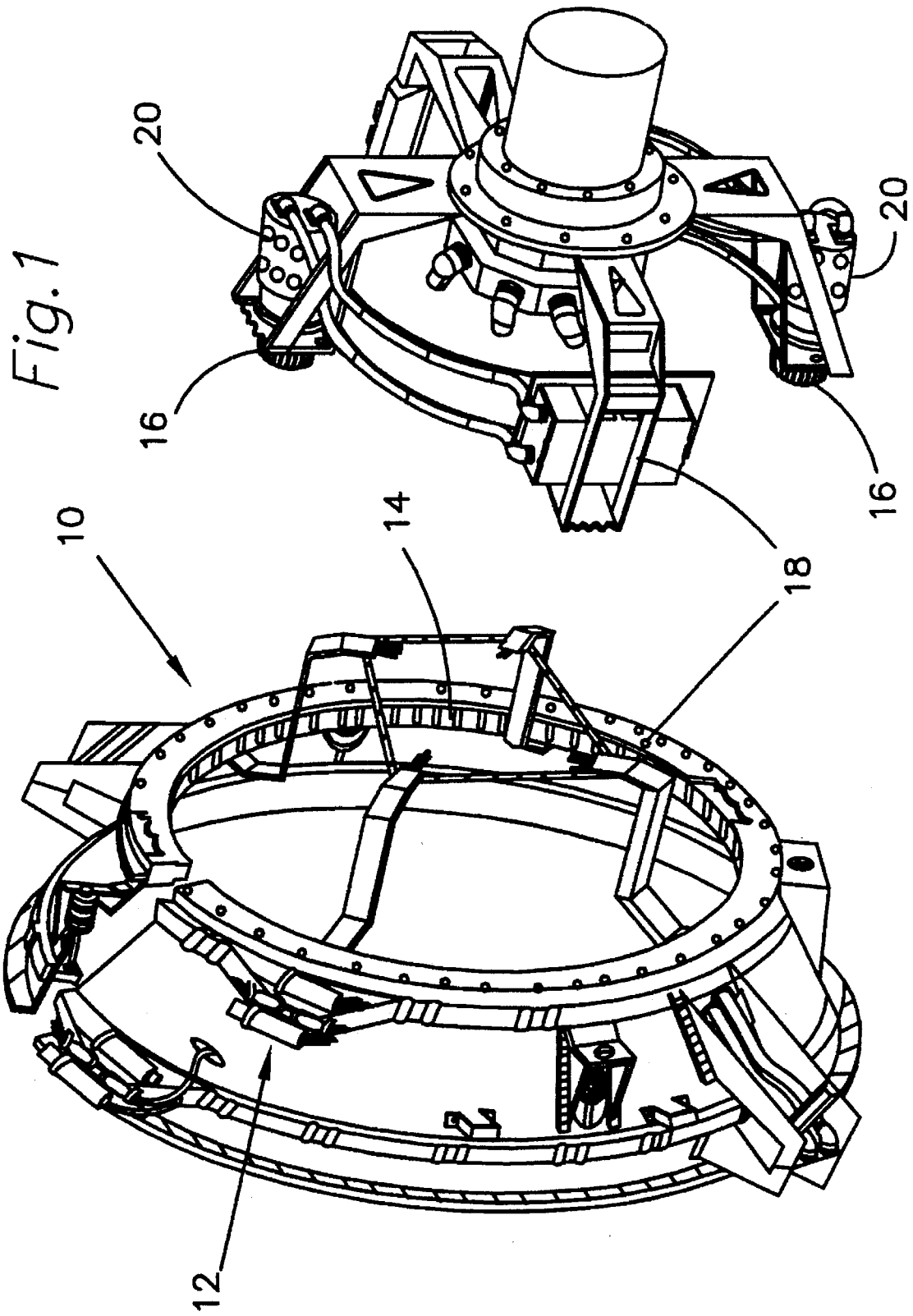
FIG. 1 shows an elevational schematic view of a spin table for supporting a satellite, and further shows the ring gear connected to the spin table and the pinion gears and drive motors for rotating the ring gear.

The present invention is particularly suitable in a spin table for imparting rotational motion to an object such as a satellite. Referring to FIG. 1, spin table 10 generally comprises circular rotating structure 12 attached to ring gear 14, and pinion gears 16 attached to a two part stationary base 18. Pinion gears 16 are driven by motors 20 which are activated to engage ring gear 14 and to operate rotating structure 12. Rotating structure is connected to a satellite (not shown) or other payload which is releasably fastened to rotating structure 12 with pyrotechnic bolts or similar release mechanism (not shown). After the satellite has been lifted by a booster rocket or similar vehicle (not shown) to a selected elevation, rotating structure 12 is released from stationary base 18 with pyrotechnic bolts or similar release mechanism. Motors 20 drive pinion gears 16 through ring gear 14 and rotate structure 12 and the satellite until the satellite is rotating at a selected angular velocity. The satellite is then released from contact with rotating structure 12 to continue its rotational movement separate from the booster rocket.

Figure 2:
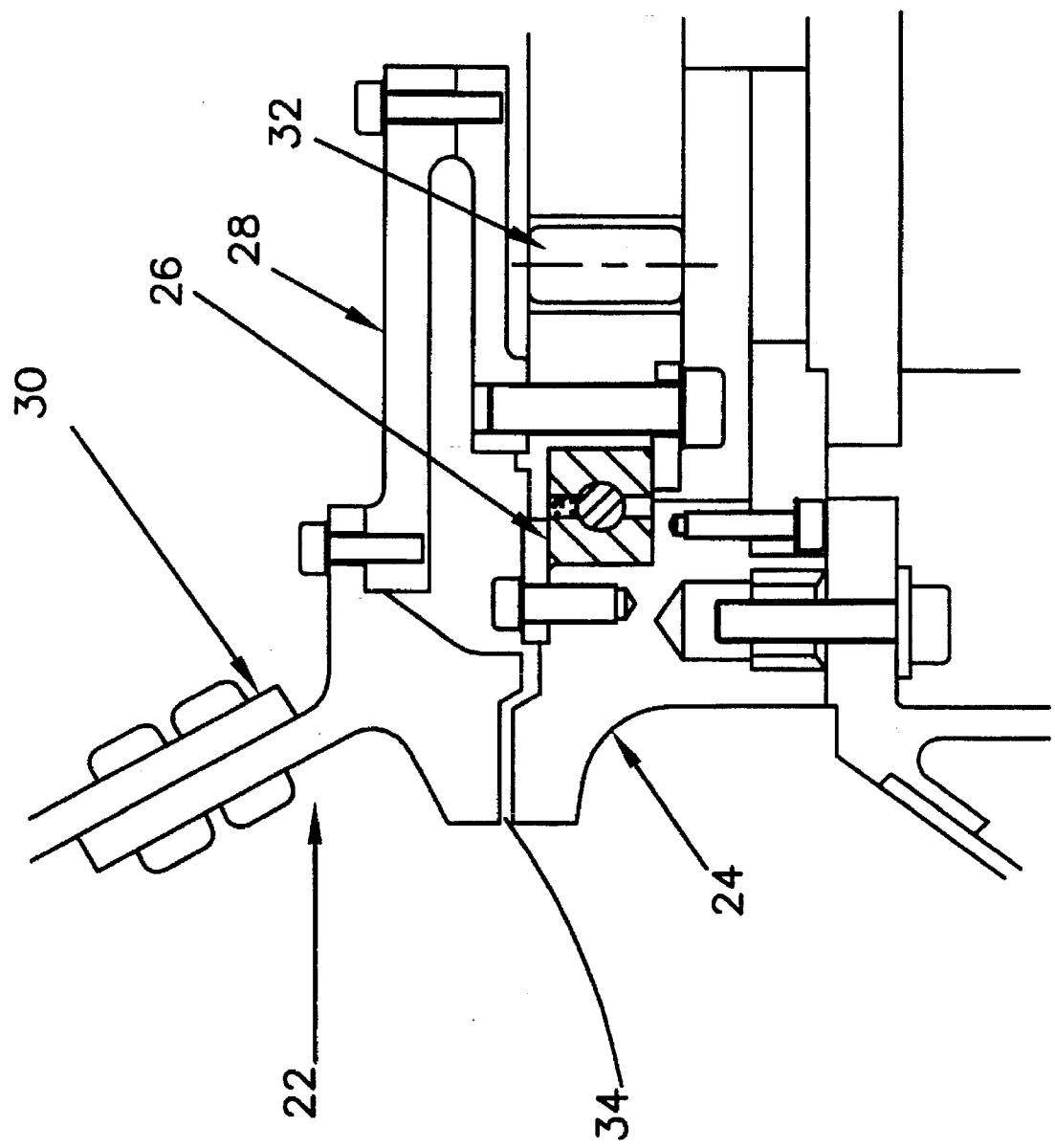
FIG. 2 shows a partial crossectional view of a prior art spin table which uses an off-load spring to separate a rotating satellite support structure from contact with a stationary base.

Referring to FIG. 2, a partial sectional view of spin table 22 known in the prior art is shown. Spin table 22 generally comprises stationary base 24, bearing 26, off-load spring 28, and rotating structure or frame 30. Structure or frame 30 is releasably attached to a satellite (not shown) and is rotated by ring gear 32 driven by a pinion gear and motor (not shown). Initially, the satellite is lifted to the desired elevation while frame 30 is fixed in contact with base 24. This fixed position between frame 30 and base 24 limits potential damage to such components and to bearing 26 during transport of the satellite. After the satellite is raised to the desired elevation, the connection between frame 30 and base 24 is removed, and off-load spring 28 urges frame 30 away from base 24 to create gap 34. In such position, gap 34 permits sufficient clearance to permit frame 30 to rotate around base 24.

The prior art apparatus illustrated in FIG. 2 is difficult to operate for several reasons. Off-load spring 28 functions as a large Belleville spring and requires careful manufacturing tolerances and specifications. For example, the failure to properly heat treat the off-load spring during manufacture can significantly affect the size of the gap created when the mechanism is operated. If the gap is too small, there is a possibility of friction between frame 30 and base 24 which would adversely affect the rotation of the satellite. If the gap is too large, the stability of frame 30 under rotation can be adversely affected, and undesirable bending moments can act on bearing 26. In addition, the extreme thermal variations experienced between a terrestrial and an extraterrestrial environment can significantly affect the performance of off-load spring 28.

The utility of off-load spring 28 is further encumbered by the need to test spin table 22 in an environment subject to gravitational acceleration. To properly test the operation of spin table 22, an object which approximates the size and mass of the satellite or other payload must be rotated to verify the operation of spin table 22 and bearing 26. During such test procedures, a mechanism simulates a zero gravity environment by uplifting the weight of the test payload from off-load spring 22 without affecting the inertial mass of the test payload as it experiences the rotational force of spin table 22. For test payloads weighing six tons and having a center of gravity ten feet above spin table 22, the task of simulating an accurate test environment can be difficult.

Figure 3:
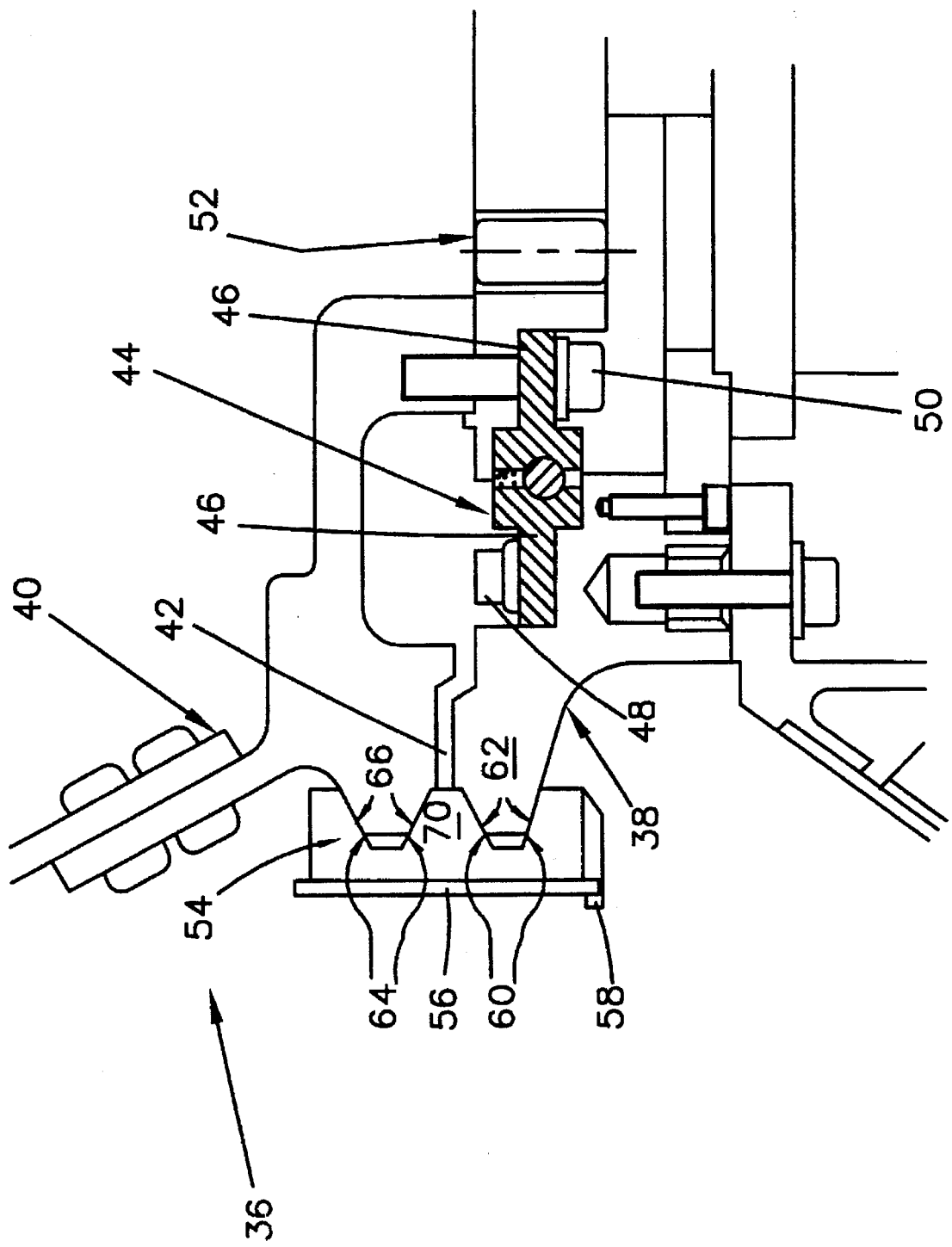
FIG. 3 illustrates a partial crossectional view of one embodiment of the invention as it relates to a spin table for rotating a satellite.

FIG. 3 illustrates one embodiment of the present invention as it relates to a spin table for rotating a satellite (not shown). As shown in FIG. 3, a partial sectional view of spin table 36 is shown. Stationary base 38 is attached to a rocket booster or other vehicle (not shown) used for transporting a satellite or other payload to a selected elevation. Frame 40 is rotatable about base 38 and is separated from base 38 with gap 42. Bearing 44 retains base 38 and frame 40 in engagement which permits frame 40 to rotate about base 38. Bearing 44 includes mounting flanges 46. Bearing 44 is rigidly attached to base 38 with threaded bolt 48 or other fastening device, and is attached to frame 40 with threaded bolt 50 or other fastening device. Ring gear 52 is also attached to frame 40 and is mated with a pinion gear or other drive (not shown) capable of rotating ring gear 52 and attached frame 40 about base 38 similar to the spin table shown in FIG. 1.

As illustrated in FIG. 3, clamp 54 is capable of contacting base 38 and frame 40 to prevent relative movement between base 38 and frame 40. Clamp 54 can be manufactured from a metal such as aluminum or from any plastic or similar material capable of contacting base 38 and frame 40 through frictional contact, or through structural engagement such as with ribs or similar protrusions or recesses in clamp 54. Clamp 54 also acts to dampen vibrational forces acting on base 38 and frame 40 during transport. Tensioner 56 is illustrated as a band capable of urging clamp 54 into contact with base 38 and frame 40. In one embodiment of the invention, tensioner 56 can comprise a metallic band having two ends (not shown). A release mechanism such as bolt 58 can operate tensioner 56 to remove clamp 54 from contact with base 38 and frame 40. In one embodiment of the invention, bolt 58 can comprise a pyrotechnic bolt, of the type known in the art, which initially draws two ends of tensioner 56 together to urge clamp 54 into contact with base 38 and frame 40, and then is removed by physical or electrical means to operate tensioner 56 to remove clamp 54 from contact with base 38 and frame 40.

One embodiment of clamp 54 is shown in FIG. 3. In this embodiment, clamp 54 is shown as a "W" band having beveled clamp surfaces 60 in contact with beveled surfaces 62 of base 38, and having beveled clamp surfaces 64 in contact with beveled surfaces 66 of frame 40. In this embodiment, clamp 54 includes protrusion 70 and surfaces 60 and 64 which contact base 38 and frame 40 to prevent relative movement therebetween. In addition, protrusion 70 prevents this relative movement while maintaining the selected dimension of gap 42. When release 58 operates tensioner 56 to remove clamp 54 from contact with base 38 and frame 40, gap 42 exists without any further manipulation or movement of the system, and permits relative movement between frame 40 relative to base 38. In the embodiment of the invention shown in FIG. 3, gap 42 permits rotation of frame 40 about base 38.

The configuration and orientation of clamp 54 can be modified without departing from the scope of the invention. For example, the contacting surface of clamp 54 can be configured as a "V" or as a flat, circular, or other shape appropriate to engage the shape of base 38 and frame 40. The contacting surface of clamp 54 can further be designed to adjust the size of gap 42 under clamping engagement, or to maintain the size of gap 42 under clamping engagement. In other embodiments of the invention, clamp 54 can engage base 38 and frame 40 through physical contact rather than through frictional contact. For example, the contacting surface of clamp 54 can be grooved or punctuated with projections or recesses which physically engage base 38 and frame 40 to prevent relative movement therebetween. In one embodiment, the surface of clamp 54 could include projections similar to the teeth of a gear which contact with opposed recesses in base 38 and frame 40. While the contact between clamp 54 and base 38 and frame 40 does not need to be a entirely rigid connection, such contact should be sufficiently strong to survive acceleration forces acting on the system during the transport of the system.

The invention significantly reduces the complexity and weight of existing retaining mechanisms, and reduces the forces acting on bearing 44. By rigidly connecting bearing 44 to base 38 and frame 40 as shown, movement of bearing 44 is controlled, and potential moments acting on bearing 44 are reduced. This is important because launch weight considerations may reduce the desired size of the system components such as bearing 44. Typically, smaller components are not as strong as larger structural components, and the designer must balance the competing parameters of weight and necessary strength. In addition, the virtual elimination of adjustable parts necessary to move frame 40 from a fixed position to a floating position relative to base 38 reduces flexure of the system which can be transferred as bending moments to bearing 44, and therefore reduces the possibility of bearing failure during transport. Furthermore, the unique use of clamp 54 isolates bearing 44 from experiencing structural loading or bending moment forces during transport, such as in the launch phase of the vehicle. Clamp 54 accomplishes this task by creating a load path for forces directly from frame 40 through clamp 54 to base 38. This load path during transport permits bearing 44 to be downsized to the forces experienced in a zero gravity environment, which reduces the weight and cost of the system.

Thus it can be seen that the present invention provides many advantages over the prior art by providing a system for releasably restraining a first element and a second element which are separated by a gap. The invention allows reduction in the weight and complexity of the system, which improves manufacturing efficiency and reduces the quantity of fuel necessary to transport the entire system. The containment of the first and second elements is accomplished by transferring the restraining load through the clamping mechanism, which isolates sensitive bearings and other components from transport forces. In addition, the release of the clamping mechanism can be accomplished without moving or adjusting either the first element or the second element, or any bearings which engage these elements. The invention also facilitates the ground testing of the system because of the absence of moving components which are designed to operate in a zero gravity environment, but are tested in the presence of a gravitational field. Consequently, the ease of testing and the test accuracy of the system is enhanced by the present invention.

Although the present invention has been described in terms of certain preferred embodiments, it will be apparent to those of ordinary skill in the art that various modifications can be made without departing from the scope of the inventive concepts. The embodiments shown herein are merely illustrative of the inventive concepts and should not be interpreted as limiting the scope of the inventive concepts.

What is claimed is:

1. A system for releasably restraining a first element and a second element in a spaced apart condition, comprising:
    a substantially rigid clamp for engaging the first element and the second element in a nonsealing manner, said clamp preventing relative movement between the first element and the second element so as to maintain the first and second elements in the spaced apart condition;
    a tensioner for maintaining said clamp in engagement with the first element and with the second element; and
    a release for operating said tensioner to remove said clamp from contact with the first element and with the second element.

2. A system as recited in claim 1, wherein the first element is capable of rotation relative to the second element and the spaced apart condition of the first and second elements is maintained after said release operates said tensioner to remove said clamp from contact with the first element and the second element.

3. A system as recited in claim 1, wherein said clamp comprises a band.

4. A system as recited in claim 1, wherein said clamp includes two detached ends, and wherein said tensioner urges said clamp into contact with the first element and with the second element by pulling together the two ends of said clamp.

5. A system as recited in claim 1, wherein said release comprises a pyrotechnic mechanism capable of being actuated by an electrical signal.

6. A system as recited in claim 2, further comprising a motor for rotating the first element about the second element after said release operates said tensioner to remove said clamp from contact with the first element and the second element.

7. A system for releasably restraining a first element and a second element in a spaced apart condition, wherein the first element is rotatable about the second element, comprising:
    a substantially rigid clamp for engaging the first element and the second element in a nonsealing manner, said clamp preventing relative movement between the first element and the second element so as to maintain the first and second elements in the spaced apart condition;
    a tensioner for urging said clamp into engagement with the first element and with the second element to maintain a gap defined by the spaced apart condition between the first element and the second element and to prevent rotation of the first element relative to the second element; and
    a release adapted for operating said tensioner to remove said clamp from contact with the first element to permit rotation of the first element relative to the second element.

8. A system as recited in claim 7, wherein said release is further adapted for operating said tensioner to remove said clamp from contact with the second element.

9. A system as recited in claim 7, further comprising a bearing located between the first element and the second element to permit the first element to rotate about the second element.

10. A system as recited in claim 7, wherein said clamp further comprises a protrusion adapted for insertion in the gap between the first element and the second element for maintaining the gap when said tensioner urges said clamp into contact with the first element and the second element.

11. A system as recited in claim 7, wherein said clamp further includes a surface having a surface irregularity for engaging the first element and the second element to prevent relative movement therebetween.

12. A system as recited in claim 11, wherein said surface irregularity is adapted to maintain the gap between the first element and the second element when said tensioner urges said clamp into contact with the first element and the second element.

13. A system for releasably restraining a rotatable first element spaced apart from a second element by a predetermined gap, comprising:
    a substantially rigid clamp adapted for insertion into the gap to engage the first element and the second element in a nonsealing manner while maintaining the spaced apart relationship between the first and second elements and for selectively preventing the first element from rotating about the second element;

a tensioner for urging said clamp into contact with the first element and with the second element to prevent relative movement therebetween and to transfer forces acting on the first element to be supported by the second element through said clamp; and a release adapted for operating said tensioner to selectively remove said clamp from contact with the first element to permit rotation of the first element about the second element.

14. A system as recited in claim 13, further comprising a bearing located between the first element and the second element for permitting the first element to rotate about the second elements, wherein said bearing includes flanges for rigidly connecting said bearing to the first element and to the second element.

15. A system as recited in claim 13, wherein said clamp engages the first element and the second element through frictional contact.

16. A system as recited in claim 13, wherein said clamp includes a surface irregularity for engaging the first element and the second element for preventing contact therebetween.

17. A system as recited in claim 13, wherein said clamp further contacts the first element and the second element to prevent the gap between the first element and the second element from increasing in size.

18. A system as recited in claim 13, further comprising a motor engaged with the first element for rotating the first element and attached satellite after said release operates said tensioner to remove said clamp from contact with the first element and the second element.

* * * * *